United States Patent
Kushevsky et al.

(10) Patent No.: US 10,937,022 B2
(45) Date of Patent: *Mar. 2, 2021

(54) SYSTEM AND METHOD FOR PROCESSING PAYMENT DURING AN ELECTRONIC COMMERCE TRANSACTION

(71) Applicant: XRomb Inc., Toronto (CA)

(72) Inventors: Mikhail Kushevsky, Toronto (CA); Michael Fainshtein, King City (CA); Valdis Andris Martinsons, Toronto (CA)

(73) Assignee: XRomb Inc., Toronto (CA)

(*) Notice: Subject to any disclaimer, the term of this patent is extended or adjusted under 35 U.S.C. 154(b) by 566 days.

This patent is subject to a terminal disclaimer.

(21) Appl. No.: 15/678,193

(22) Filed: Aug. 16, 2017

(65) Prior Publication Data

US 2017/0344979 A1    Nov. 30, 2017

Related U.S. Application Data

(63) Continuation of application No. 13/686,982, filed on Nov. 28, 2012, now Pat. No. 9,767,453.

(Continued)

(51) Int. Cl.
  *G06Q 20/36*  (2012.01)
  *G06Q 20/32*  (2012.01)
  (Continued)

(52) U.S. Cl.
  CPC ....... *G06Q 20/3674* (2013.01); *G06Q 20/322* (2013.01); *G06Q 20/3255* (2013.01);
  (Continued)

(58) Field of Classification Search
  None
  See application file for complete search history.

(56) References Cited

U.S. PATENT DOCUMENTS

| 7,389,913 B2 | 6/2008 | Starrs |
| 7,822,688 B2 | 10/2010 | Labrou et al. |

(Continued)

FOREIGN PATENT DOCUMENTS

| CA | 2686259 A1 | 5/2010 |
| EP | 1280115 A2 | 1/2003 |

(Continued)

OTHER PUBLICATIONS

School Money Ping Ping, retrieved from Internet Jan. 15, 2012, pp. 1-4; http://www_pingping.be/wp/use-your-pingping/school-money/.

(Continued)

*Primary Examiner* — Steven S Kim
*Assistant Examiner* — Jason B Fenstermacher
(74) *Attorney, Agent, or Firm* — Bereskin & Parr LLP/S.E.N.C.R.L., s.r.l.

(57) ABSTRACT

A method and system for processing payment during an electronic commerce transaction is described herein. The system includes: a mobile device configured to provide an electronic wallet storing a payment card, the payment card comprising card payment information, and a card security credential. The system may also include a coordination server configured to receive a request to conduct the electronic commerce transaction, and send an activation message to the mobile device to activate the electronic wallet. When the electronic wallet is activated, the mobile device may be further configured to: receive a card selection input indicating selection of the payment card for payment in the electronic commerce transaction; verify a security input against the card security credential of the payment card; and send the card payment information and confirmation that the payment card was present during the verifying for use in completing the electronic commerce transaction.

20 Claims, 7 Drawing Sheets

Related U.S. Application Data

(60) Provisional application No. 61/602,404, filed on Feb. 23, 2012.

(51) Int. Cl.
  *G06Q 20/40* (2012.01)
  *H04W 12/08* (2021.01)

(52) U.S. Cl.
  CPC .......... *G06Q 20/36* (2013.01); *G06Q 20/405* (2013.01); *G06Q 20/4012* (2013.01); *H04W 12/08* (2013.01)

(56) References Cited

U.S. PATENT DOCUMENTS

| | | |
|---|---|---|
| 7,860,722 B1 | 12/2010 | Chow |
| 7,926,714 B1 | 4/2011 | Zhu |
| 8,099,361 B1 | 1/2012 | Gupta et al. |
| 8,255,278 B1 | 8/2012 | Young et al. |
| 8,561,892 B2 | 10/2013 | Hayhow et al. |
| 8,577,804 B1 | 11/2013 | Bacastow |
| 8,621,595 B2 | 12/2013 | Hayhow et al. |
| 9,767,453 B2 | 9/2017 | Kushevsky |
| 2002/0103753 A1 | 8/2002 | Schimmel |
| 2003/0018587 A1 | 1/2003 | Althoff et al. |
| 2003/0055756 A1 | 3/2003 | Allan |
| 2003/0055792 A1 | 3/2003 | Kinoshita et al. |
| 2004/0019564 A1* | 1/2004 | Goldthwaite .......... G06Q 20/04 705/44 |
| 2006/0190324 A1 | 8/2006 | Adkins et al. |
| 2008/0067232 A1* | 3/2008 | Whytock ............... G06F 21/57 235/379 |
| 2008/0154770 A1 | 6/2008 | Rutherford et al. |
| 2008/0167000 A1 | 7/2008 | Wentker et al. |
| 2008/0249931 A1 | 10/2008 | Gilder et al. |
| 2009/0039150 A1 | 2/2009 | Lay |
| 2009/0063312 A1 | 3/2009 | Hurst |
| 2009/0070263 A1 | 3/2009 | Davis et al. |
| 2009/0070272 A1* | 3/2009 | Jain ....................... G06Q 20/341 705/75 |
| 2009/0099961 A1 | 4/2009 | Ogilvy |
| 2009/0125429 A1 | 5/2009 | Takayama |
| 2009/0177319 A1 | 7/2009 | Garibaldi et al. |
| 2009/0307142 A1 | 12/2009 | Mardikar |
| 2010/0088237 A1 | 4/2010 | Wankmueller |
| 2010/0131347 A1 | 5/2010 | Sartipi |
| 2010/0223145 A1 | 9/2010 | Dragt |
| 2011/0078034 A1 | 3/2011 | Hayhow |
| 2011/0225044 A1 | 9/2011 | Duffy |
| 2011/0225057 A1 | 9/2011 | Webb et al. |
| 2011/0244920 A1 | 10/2011 | Coppinger |
| 2012/0005026 A1 | 1/2012 | Khan et al. |
| 2012/0016731 A1 | 1/2012 | Smith et al. |
| 2012/0078751 A1 | 3/2012 | MacPhail et al. |
| 2012/0143752 A1 | 6/2012 | Wong et al. |
| 2012/0179558 A1* | 7/2012 | Fischer ................. G06Q 20/20 705/16 |
| 2012/0197801 A1 | 8/2012 | Jimenez |
| 2012/0221475 A1* | 8/2012 | Grigg .................... G06Q 20/20 705/67 |
| 2012/0284130 A1 | 11/2012 | Lewis et al. |
| 2013/0073365 A1 | 3/2013 | McCarthy |
| 2013/0132283 A1 | 5/2013 | Hayhow et al. |
| 2013/0226792 A1 | 8/2013 | Kushevsky |
| 2013/0254053 A1 | 9/2013 | Hayhow et al. |
| 2013/0254116 A1 | 9/2013 | Hayhow et al. |
| 2013/0254119 A1 | 9/2013 | Hayhow et al. |
| 2014/0067571 A1 | 3/2014 | Schlosser et al. |
| 2014/0108265 A1 | 4/2014 | Hayhow et al. |
| 2016/0267460 A1 | 9/2016 | Lamba |

FOREIGN PATENT DOCUMENTS

| | | | |
|---|---|---|---|
| JP | 2005267012 A | 9/2005 | |
| WO | WO-2005086593 A2 * | 9/2005 | ............. G06Q 20/20 |
| WO | 2006085805 A1 | 8/2006 | |
| WO | 2009055719 A2 | 4/2009 | |
| WO | 2009097215 A1 | 8/2009 | |
| WO | 2010036863 A2 | 4/2010 | |
| WO | 2010078530 A2 | 7/2010 | |
| WO | WO-2010078530 A2 * | 7/2010 | ......... G06Q 30/0232 |
| WO | 2011049871 A1 | 4/2011 | |
| WO | 2011065807 A1 | 6/2011 | |
| WO | 2011163525 A1 | 12/2011 | |
| WO | 2012021864 A2 | 2/2012 | |
| WO | 2012042262 A1 | 4/2012 | |
| WO | 2012151590 A2 | 11/2012 | |
| WO | 2013123578 A1 | 8/2013 | |

OTHER PUBLICATIONS

TD Canada Trust—Credit Cards, retrieved from Internet Jan. 24, 2012, p. 1; http://www.tdcanadatrust_com/tdvisa/easyswitch/index.jsp?visa=reward.

ViV0pay Kiosk, Products: Contactless POS Terminals, ViVOtech:Products:ViV0pay, retrieved from Internet Jan. 30, 2012, pp. 1-2; http:www.vivotech.com/products/vivo_pay/vivopay_kiosk.asp.

Port G8, USA Technologies, Inc_, retrieved from Internet Feb. 1, 2015, pp. 1-3; http://www_usatech_com/eport ..port_G8.php.

ePort, USA Technologies, Inc., retrieved from Internet Feb. 1, 2015, p. 1; http://www.usatech.com/eport/.

Lark, Sarah, Italian fashion house launches NFC loyalty and marketing programme, Jul. 28, 2009, pp. 1-2; http://Nww.nrcworld.com/2009/07/28/31443/italian-fashion-houselaunches-nfc-loyalty-and-marketing-programme/.

Gemalto, Online Security With Smart Bank Cards, retrieved from Internet Jan. 30, 2012; webpages from http://www.gemalto.com/emv/online—security.html.

FaceCash Transfers, Vimeo, retrieved from Internet Jan. 30, 2012; http://vimeo.com/17483836.

FaceCash Bill Splitting, Vimeo, retrieved from Internet Jan. 30, 2012; http://vimeo.com/17484494.

Chavanu, Bakari, 3 Great Apps to Easily & Fairly Split A Bill Among Several People [iPhone], Jan. 2, 2012.

Written Opinion for corresponding PCT/CA2013/001000, dated Feb. 14, 2014.

International Search Report for corresponding PCT/CA2013/001000, dated Feb. 14, 2014.

Xinfotech, Authentication solution for e-commerce and e-banking, webpages from http://www.x-infotech.com/products_and_solutions/40-authentication-solution-for-e-commerce-and-e-banking.

Extended European Search Report (EESR) related to European Application No. 13751192.9, dated Nov. 6, 2015.

Written Opinion. Pending Canadian PCT/CA2013/000152. dated May 14, 2013.

International Search Report. Pending Canadian PCT/CA2013/000152. dated May 14, 2013.

* cited by examiner

SYSTEM AND METHOD FOR PROCESSING PAYMENT DURING AN ELECTRONIC COMMERCE TRANSACTION

CROSS-REFERENCE TO RELATED APPLICATION

This application claims the benefit of U.S. Provisional Patent Application No. 61/602,404, entitled "System and Method for Processing Payment During an eCommerce Transaction", filed Feb. 23, 2012 and is a continuation of U.S. patent application Ser. No. 13/686,982, entitled "System and Method for Processing Payment During an Electronic Commerce Transaction", filed in Nov. 28, 2012. The entire contents of U.S. Provisional Patent Application No. 61/602,404 and U.S. patent application Ser. No. 13/686,982 are hereby incorporated by reference.

FIELD

The described embodiments relate to methods and systems for processing payment during an electronic commerce transaction.

BACKGROUND

When a credit card is accepted for payment in a transaction, the physical card may or may not be present. In a "Card Present" (CP) transaction such as a transaction at a point-of-sale terminal, the physical card is typically read by a physical card reader (e.g., allowing either the magnetic stripe or the chip on the payment card to be read). When such transactions are subsequently processed, the transaction is registered as "Card Present" as an indication that the transaction is less likely to be fraudulent because of the presence of the card.

In a "Card Not Present" (CNP) transaction, payment is typically processed based on the card payment information alone (e.g., name, credit card number, expiry date, and/or a card verification value (CVV)), without verification of the presence of the physical card via a swipe or entry into a payment terminal. For example, such transactions may include a telephone transaction (where the card payment information is provided orally over the phone) or an electronic commerce transaction (where the card payment information may be manually entered onto a website hosted on a merchant server). When these transactions are subsequently processed, the transactions are registered as "Card Not Present" as an indication that the transaction has a higher likelihood of being fraudulent (i.e., recognizing that it is likely easier for payment card information to be stolen than it is to make a copy of the physical card).

To account for the higher risk of fraud with CNP transactions, payment card processing services typically charge merchants higher fees for processing CNP transactions than for processing CP transactions.

SUMMARY

In a first aspect, some embodiments of the invention provide a method of processing payment during an electronic commerce transaction, the method comprising:
  providing a mobile device having an electronic wallet storing a payment card, the payment card comprising card payment information and a card security credential;
  receiving, at a coordination server, a request to conduct the electronic commerce transaction;
  sending, from the coordination server, an activation message to the mobile device to activate the electronic wallet;
  receiving, at the mobile device, a card selection input indicating selection of the payment card for payment in the electronic commerce transaction;
  verifying, at the mobile device, a security input against the card security credential of the payment card; and
  sending, from the mobile device,
    the card payment information, and
    confirmation that the payment card was present during the verifying,
  for use in completing the electronic commerce transaction.

In another aspect, some embodiments of the invention provide a system for processing payment during an electronic commerce transaction, the system comprising:
  a mobile device comprising a device processor and a device memory storing a first plurality of instructions, which when executed by the device processor, causes the device processor to provide an electronic wallet storing a payment card, the payment card comprising card payment information, and a card security credential;
  a coordination server comprising a server processor and a server memory storing a second plurality of instructions, which when executed by the server processor, cause the server processor to:
    receive a request to conduct the electronic commerce transaction, and
    send an activation message to the mobile device to activate the electronic wallet; and
  wherein, the mobile device is further configured to:
    receive a card selection input indicating selection of the payment card for payment in the electronic commerce transaction;
    verify a security input against the card security credential of the payment card; and
    send:
      the card payment information, and
      confirmation that the payment card was present during the verifying,
    for use in completing the electronic commerce transaction.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1:
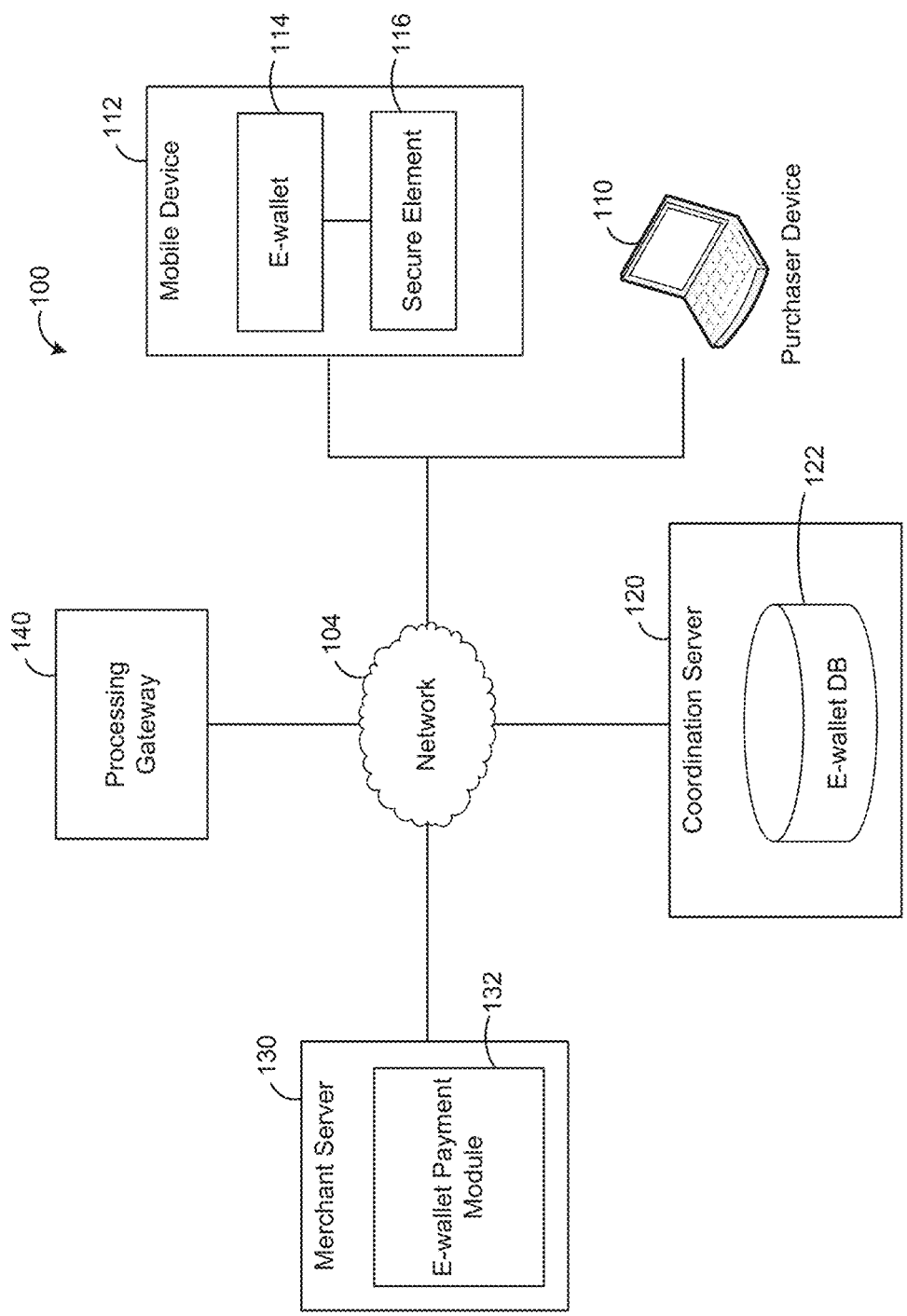
FIG. 1 is a block diagram of a system for processing payment during an electronic commerce transaction, in accordance with an embodiment of the present disclosure.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor (e.g., a microprocessor), a data storage system (including volatile and non-volatile memory and/or storage elements), at least one input device, and at least one output device. For example and without limitation, the programmable computers (referred to below as computing devices) may be a personal computer, laptop, personal data assistant, cellular telephone, smart-phone device, tablet computer, and/or wireless device. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Moreover, the subject system may be implemented as one or more software components stored on one or more computer servers that are accessible via one or more client machines in a client-server architecture. In such case, the system can be considered to be a hosted software offering or a software service employed in a software-as-a-service deployment.

Referring to FIG. 1, therein illustrated is a block diagram illustrating a system for processing payment during an electronic commerce ("e-commerce") transaction, referred to generally as 100. The system may include a purchaser device 110, a mobile device 112, a coordination server 120, a merchant server 130, and a processing gateway 140, each including a network interface (not shown) for connecting to network 104.

In the traditional scenario of an e-commerce transaction, a purchaser using purchaser device 110 may access an e-commerce website made available at merchant server 130. The purchaser may select items for purchase, and when the purchaser is ready to "check out", they may complete the transaction by paying with a credit card. This may involve a CNP transaction in which the purchaser manually enters the card payment information (e.g., credit card number, expiry date, etc., as discussed above) into the merchant website. The merchant server 130 may then process the payment by sending the card payment information to processing gateway 140 for authorization. If authorization is approved, the e-commerce transaction is complete.

From a high-level perspective, the subject embodiments employ a mobile device 112 having an electronic wallet ("e-wallet") storing a payment card to facilitate a CP transaction in an e-commerce transaction.

When a purchaser device 110 initiates an e-commerce transaction with a merchant server 130 and proceeds to complete a transaction, the merchant server 130 may send a request to a coordination server 120. The coordination server 120, in turn, may send an activation message to the mobile device 112 to activate the e-wallet 114. The e-wallet 114 may display a summary of the e-commerce transaction, and display payment options to the user so that a user may select the payment option with which to pay for the e-commerce transaction. As the payment card stored in the e-wallet 114 is an actual copy of the payment card, the e-wallet 114 will also store a card security credential (e.g., an encrypted Personal Identification Number (PIN)) associated with the payment card. This may allow the mobile device 112 to receive a security input for verification against the card security credential. Once verified, the e-wallet 114 may be able to confirm the presence of the card when the payment card is used for payment in the e-commerce transaction.

The mobile device 112 may then send the card payment information and confirmation of card presence to the processing gateway 140 for processing. If the processing gateway 140 receives approval to allow use of the payment card for the e-commerce transaction, the processing gateway 140 may send a message to the merchant server 130 to indicate that the e-commerce transaction is complete.

As noted above, the fees paid by a merchant for processing CNP transactions are typically higher than they are for CP transactions. By providing the ability to conduct a CP e-commerce transaction, the subject embodiments described herein may be desirable for merchants operating merchant servers because they would be able to reduce the amount of fees they pay for payment card processing.

The various components in FIG. 1 will now be described in greater detail.

A merchant server 130 may be any suitable computing device that is capable of hosting an e-commerce store that allows purchasers to view and select items for purchase. Merchant server 130 may include a network interface for connecting to the network 104, for example, to communicate with coordination server 120, processing gateway 140, purchasing device 110, and/or mobile device 112.

An e-commerce store on merchant server 130 may be made available in the form of a web server application that is accessible by a web browser application on a purchaser device 110. In some embodiments, the e-commerce store may be made available as a web service that is accessible by a standalone application on the purchaser device 110.

The e-commerce store may include shopping cart functionality to allow a user to select items for purchase prior to payment. When a purchaser is ready to pay for the selected items, they may proceed to "check out" and provide payment for the selected items. (If the selected goods are physical goods, such "check out" process may include presenting a user interface to receive a shipping address that the purchased goods should be shipped to).

When receiving payment, the e-commerce store on the merchant server 130 may include a payment processing module operable to allow a purchaser to select the type of payment they would like to use to pay for the e-commerce transaction. As discussed in greater detail below, such payment processing module may include an e-wallet payment module 132 that is configured to receive payment from an e-wallet 114 stored on mobile device 112.

If a purchaser selects to pay with a payment card (e.g., such that the purchaser would be required to manually enter the card payment information on the merchant server 130), merchant server 130 may send a request for authorization to the processing gateway 140 to obtain authorization for use of the payment card in the e-commerce transaction. The request may include payment card information (e.g., a credit card number, the credit card expiry date, and/or card verification value (CVV)) needed to obtain authorization for use in the e-commerce transaction.

Processing gateway 140 may then subsequently send the payment card information to other processing platforms (not shown) to complete the authorization process. For example, such other processing platforms may include an acquiring institution (e.g., a bank that provides credit and debit processing services to the merchant), the payment card network (e.g., VisaNet®, MasterCard® Worldwide Network, American Express®, Discover Network, or Interac Payment Network) and/or the issuing institution (e.g., the processing network services from the banks, credit unions or institutions that issued credit or debit card directly to their respective cardholders).

As discussed in greater detail below, the mobile device 112 in the subject embodiments may be configured to transmit payment card information directly to the processing gateway 140 so that the merchant server 130 can avoid processing the payment card information itself. Such configuration may be desirable, for example, to a merchant because the merchant would not have to assume the risk associated with processing payment card information.

Coordination server 120 may be any computing device suitable to relay a message between a merchant server 130 and mobile device 112. The coordination server 120 may include a network interface for connecting to the network 104, for example, to communicate with merchant server 130 and/or mobile device 112.

The coordination server 120 may, in various embodiments, include an e-wallet database 122 that stores account information for individuals that desire to pay using an e-wallet 114. For example, such information may include a login username and/or password for an e-wallet account in the e-wallet database 122 stored on the coordination server 120 that corresponds to the e-wallet 114. Such wallet information may also include information relating to methods of accessing the mobile device 112. For example, such access information may include a phone number, an Internet Protocol (IP) and/or a Media Access Control (MAC) address for the mobile device 112.

In various embodiments, the coordination server 120 may not store access information for the mobile device 112. Instead, the e-wallet payment module 132 at merchant server 130 may receive access information (e.g., a phone number) for a mobile device 112 as directly entered by a purchaser onto merchant server 130.

Although illustrated as separate servers, in various embodiments, the coordination server 120 may be incorporated into the merchant server 130 such that functionality of the coordination server 120 resides on the same computing device as the merchant server 130.

A purchaser device 110 may be any computing device that is operable to access the merchant server 130 to initiate an e-commerce transaction. Such devices 110 may include desktop or laptop computers, cellular phones, smartphones (e.g., Apple® iPhone®, BlackBerry®, Android™ or other suitable network-connected computing devices such as a tablet computer (e.g., Apple® iPad™).

In some embodiments, the e-commerce transaction initiated by a purchaser may be performed by a purchaser accessing a web browser application executing on the purchaser device 110 to visit the website of an e-commerce merchant available on merchant server 130.

A mobile device 112 may be any computing device capable of storing an e-wallet application 114. In some embodiments, the mobile device 112 may be a smartphone that includes a secure element 116 storing one or more payment cards, with the payment cards including payment card information and a security credential such as an encrypted Personal Identification Number (PIN). As discussed in greater detail below, a purchaser may enter a security input onto the mobile device 112 that can be verified against the security credential by the e-wallet 114.

While the various components in FIG. 1 have been illustrated as being separate, in various embodiments, they may be consolidated and executed on the same device. For example, the purchaser device 110 and the mobile device 112 may be the same device. That is, the mobile device 112 on which the e-wallet 114 is stored may also be used by a purchaser to initiate the e-commerce transaction. Similarly, as discussed, the functionality of the coordination server 120 may be incorporated within the merchant server 130.

The network 104 may be any network(s) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

In some embodiments, the network 104 may be any network which allows access to the merchant server 130 or the coordination server 120 from remote locations outside of a Local Area Network (LAN) within which the merchant server 130 or the coordination server 120 operates.

Figure 2:
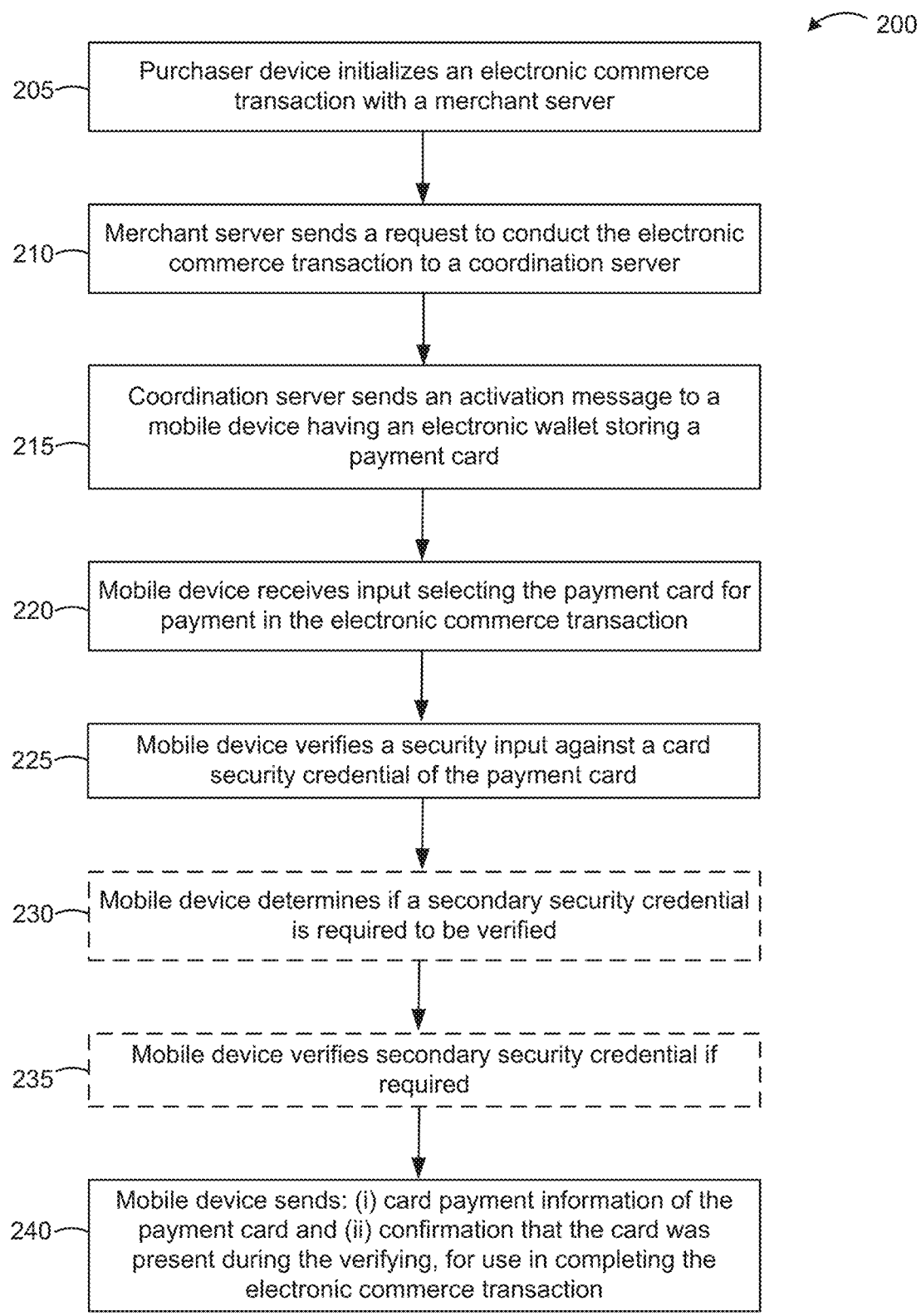
FIG. 2 is a flowchart diagram illustrating the steps of processing payment during an electronic commerce transaction, in accordance with an embodiment of the present disclosure.

Referring to FIG. 2, illustrated therein is a flowchart diagram showing the steps of processing payment during an e-commerce transaction, in accordance with an embodiment of the present disclosure. To illustrate the steps of the method, reference will be made simultaneously to FIGS. 3, 4, 5 and 6 which illustrate various example screenshots of a merchant website on merchant server 130 or an e-wallet 114 on mobile device 112 for an example scenario in which a purchaser visits an e-commerce merchant named "BEST MART" to purchase various electronics items.

At step 205, a purchaser device 110 initiates an e-commerce transaction with a merchant server 130. As discussed, this may be performed by a purchaser using a web browser executing on the purchaser device 110 to access an e-commerce website made available through a web server executing on merchant server 130. Additionally or alternatively, the purchaser device 110 may be executing a standalone application (e.g., a dedicated application executing on a mobile operating system such as iOS® or Android™) that is configured to access an e-commerce store that is made available through web services executing on merchant server 130.

Figure 3:
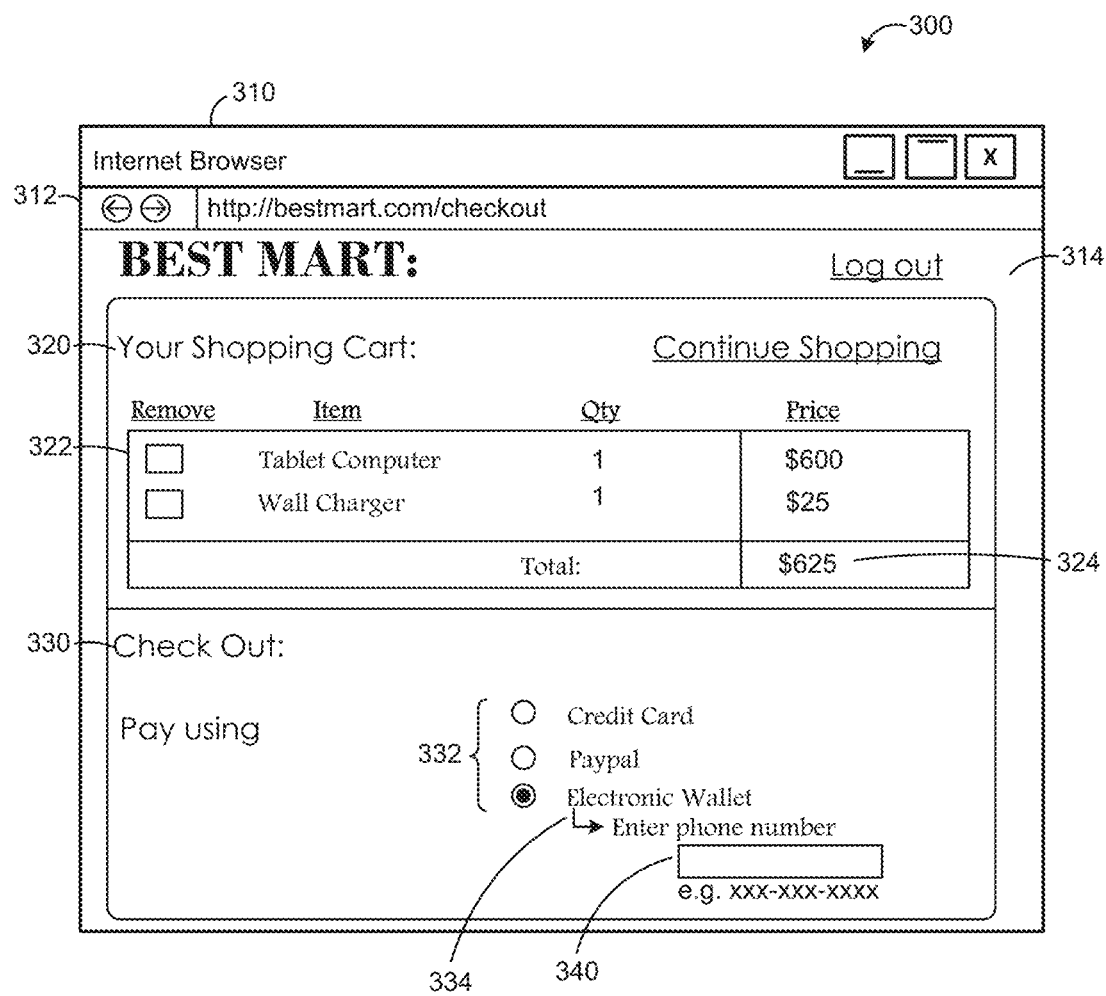
FIG. 3 is an example screenshot illustrating a check out page of an electronic commerce website.

Referring simultaneously to FIG. 3, illustrated therein generally as 300 is an screenshot of an internet browser showing an e-commerce website for an example merchant named "BEST MART". The internet browser 310 may include controls 312 for navigating websites, as is known in the art. The e-commerce website 314 may contain "shopping cart" functionality 320 to allow a purchaser to select items for purchase.

Once a purchaser has completed selecting items for purchase, they may decide to "check out" of the e-commerce store and provide payment for the items they've selected to purchase. The "check out" user interface may provide a summary 322 of the items selected to be purchased. In the example illustrated in FIG. 3, such items include a "Table Computer" on sale for "$600" and a "Wall Charger" on sale for "$25", for a total amount payable totaling "625". The "check out" user interface may also be configured to provide various payment options 332 to the purchaser to allow him/her to select a payment method to pay for the e-commerce transaction. Such payment methods may include traditional e-commerce payment methods such as a credit card (which may require the manual entering of card payment information) or a third-party payment service such as Paypal®.

The "check out" user interface may also present an option 334 to pay using an e-wallet. When selected, the e-wallet payment module 132 on merchant server 130 may request an e-wallet identifier from the purchaser. As discussed above, in various embodiments, the e-wallet identifier may include a login username and password for logging into an e-wallet account on coordination server 120. In such embodiments, the coordination server 120 may reference an e-wallet database 122 to locate an identifier for the mobile device 122 associated with the e-wallet account. Additionally or alternatively, the e-wallet payment module 132 may receive the mobile device 122 identifier directly from the purchaser. In the example embodiment illustrated in FIG. 3, the mobile device identifier (e.g., a phone number associated with a smartphone device 112) is requested directly from the purchaser via a text field 340 that is operable to receive the mobile device identifier.

At step 210, the merchant server 130 sends a request to conduct the e-commerce transaction to the coordination server 120. The request may include various details about the e-commerce transaction. For example, the request may include the name of the e-commerce merchant, a summary of the items that are to be purchased and their respective prices, and/or a total amount payable in the transaction. The request may also include an identifier for assisting with the identification of the mobile device (the identifier not being associated with the payment card). For example, this identifier may be an e-wallet account identifier (e.g., login user name/password), and/or a mobile device 112 identifier (e.g., a phone number).

In various embodiments, the coordination server 120 may receive the request to conduct the e-commerce transaction directly from the purchaser device 110 instead of from the merchant server 120. This may be possible, for example, in embodiments where the "shopping cart" and "check out" operations of the e-commerce store are executing directly on the purchaser device 110, and the "check out" operations on the purchaser device 110 is configured to receive the e-wallet account identifier and/or mobile device 112 identifier.

At step 215, the coordination server 120 sends an activation message to a mobile device 112 having an e-wallet 114 storing a payment card comprising card payment information and a card security credential. The activation message may be addressed to the mobile device 112 using the identifier earlier discussed. For example, this may be an IP address or MAC address that is stored on an e-wallet database 122 on the coordination server 120. In such embodiments, the activation message transmitted to the mobile device 112 may be encrypted according to known methods to ensure safe exchange of information between the coordination server 120 and the mobile device 112.

In the example embodiment, the identifier is a phone number that identifies a smartphone mobile device 112, and the activation message may be a Short Message Service (SMS) message that is sent via a cellular communications network, according to known methods. Although SMS is discussed herein, it will be understood that any other messaging protocol that is initiated by a system handshake may be suitable. In some embodiments, the mobile device 112 may be configured to receive the SMS message without explicitly notifying the user of the mobile device 112 that an SMS message has been received. Use of such a "hidden" SMS message may be desirable in providing a smooth experience for the user—i.e., without interrupting the activation of the e-wallet 114 with a notification about a received SMS message. Using an SMS message to communicate an activation message may be desirable because it is an out-of-band communication that does not use the IP protocol network that is typically used to communicate between the purchaser device 110 and the merchant server 130 when an e-commerce transaction is initiated. Although such communications may not necessarily be encrypted when sent via cellular communication network operators, the meaning of such messages would only be known to e-wallet application 114 such that even if the messages are intercepted, security would not be compromised.

Once the activation message has been received by the mobile device 112, the mobile device 112 may be configured to activate the e-wallet application 114 on the mobile device 112.

As noted above, the mobile device 112 may include a secure element 116 that stores a payment card that contains (i) card payment information and (ii) a card security credential for the payment card. Prior to the initiation of an e-commerce transaction currently discussed, the e-wallet 114 may be provisioned with one or more payment cards. Such provisioning may include storing prepaid credit cards or existing plastic cards onto the secure element 116 of the mobile device 112.

A secure element 116 is a protected processor and memory space of a mobile device 112 that is separate and independent of the main processor and memory space of the mobile device 112. That is, the secure element 116 (secure memory and execution environment) may be an environment in which application code and application data can be securely stored and administered and in which secure execution of applications occur. The secure element 116 may be embodied in highly secure cryptographic chips (e.g., a smart card chip).

Only trusted applications such as an e-wallet 114 may access the secure element 116 to store data onto it. The secure element 116 may provide delimited memory for each application and functions that encrypt, decrypt, and sign data packets being communicated to and from the secure element 116. This may increase the security of the secure element 116 and reduce the possibility that the secure element 116 may be tampered with. Accordingly, the payment card stored on the secure element 116 may be considered to be an actual payment card itself such that if an e-wallet 114 verifies a security input against a card security credential stored on the secure element 116 (step 225, discussed below), the verification can be considered to be verified against the payment card itself. Put another way, the secure element 116 may be characterized as storing virtual payment cards.

In some embodiments, the e-wallet 114 may be executing on the secure execution environment of the secure element.

The secure element 116 may be provided in various ways on the mobile device 112. For example, the secure element 116 may be coupled with a Near Field Communications (NFC) chip provided on the mobile device 112, or it may be provided on a Subscriber Identity Module (SIM) card of the mobile device 112, or it may be provided on a removable memory (e.g., microSD) integrated circuit that may be entered into a slot for receiving such memory on the mobile device 140. It will be understood that other further methods of providing a secure element 116 on the mobile device 112 may be possible.

Figure 4:
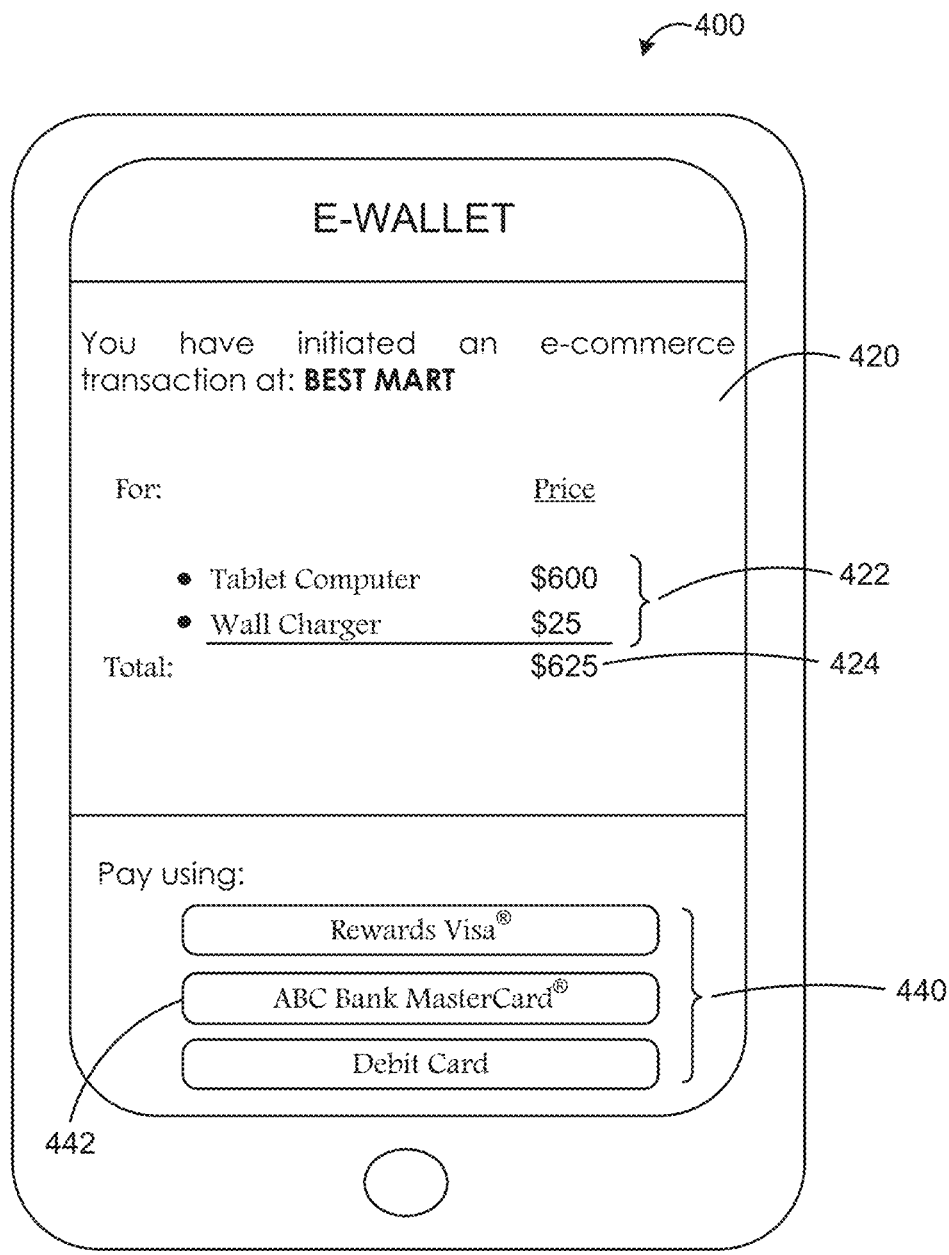
FIG. 4 is an example screenshot illustrating a payment card selection screen for an electronic wallet application executing on a mobile device.

Referring simultaneously to FIG. 4, therein illustrated generally as 400 is an example screenshot illustrating a payment card selection screen of an e-wallet 114 on a mobile device 112. Such example screenshot may be presented in the e-wallet application 114 after the activation message is received at the mobile device 112. The e-wallet application 114 may display a user interface 420 that summarizes the e-commerce transaction initiated by the purchaser using the purchaser device 110. For example, this may include the name of the e-commerce merchant "BEST MART", a listing of the items selected to be purchased 422, and a total amount payable 424. The e-wallet application 114 may also present the purchaser with a list of payment cards 440 that are stored on the e-wallet 114 that can be used to pay for the e-commerce transaction.

At step 220, the mobile device 112 receives a card selection input from a user indicating selection of a payment card for payment in the e-commerce transaction. Continuing with the example in FIG. 4, the purchaser may select their "ABC Bank Mastercard®" 442.

At step 225, the mobile device 112 verifies a security input against the card security credential of the payment card. As noted, the secure element 116 on the mobile device 112 stores a payment card that includes a card security credential. This allows the e-wallet 114 to receive a security input for the purpose of verifying against the card security credential. An example of a security credential may be an encrypted PIN that is stored on the secure element 116. This may be the same PIN that is encrypted on an integrated circuit (IC) card such as that which has been standardized by existing payment card providers Europay, MasterCard®, and Visa® (collectively known as EMV cards). As such, the storing of the payment card on the secure element 116, in effect, allows the mobile device 112 to be an actual payment card itself such that when a purchaser verifies a security input against the security credential, the presence of the payment card and/or the cardholder may be verified.

When verifying the security credential, the e-wallet 114 may be configured to determine whether the inputted PIN matches the encrypted PIN stored on the secure element 116 of the mobile device 112.

Figure 5:
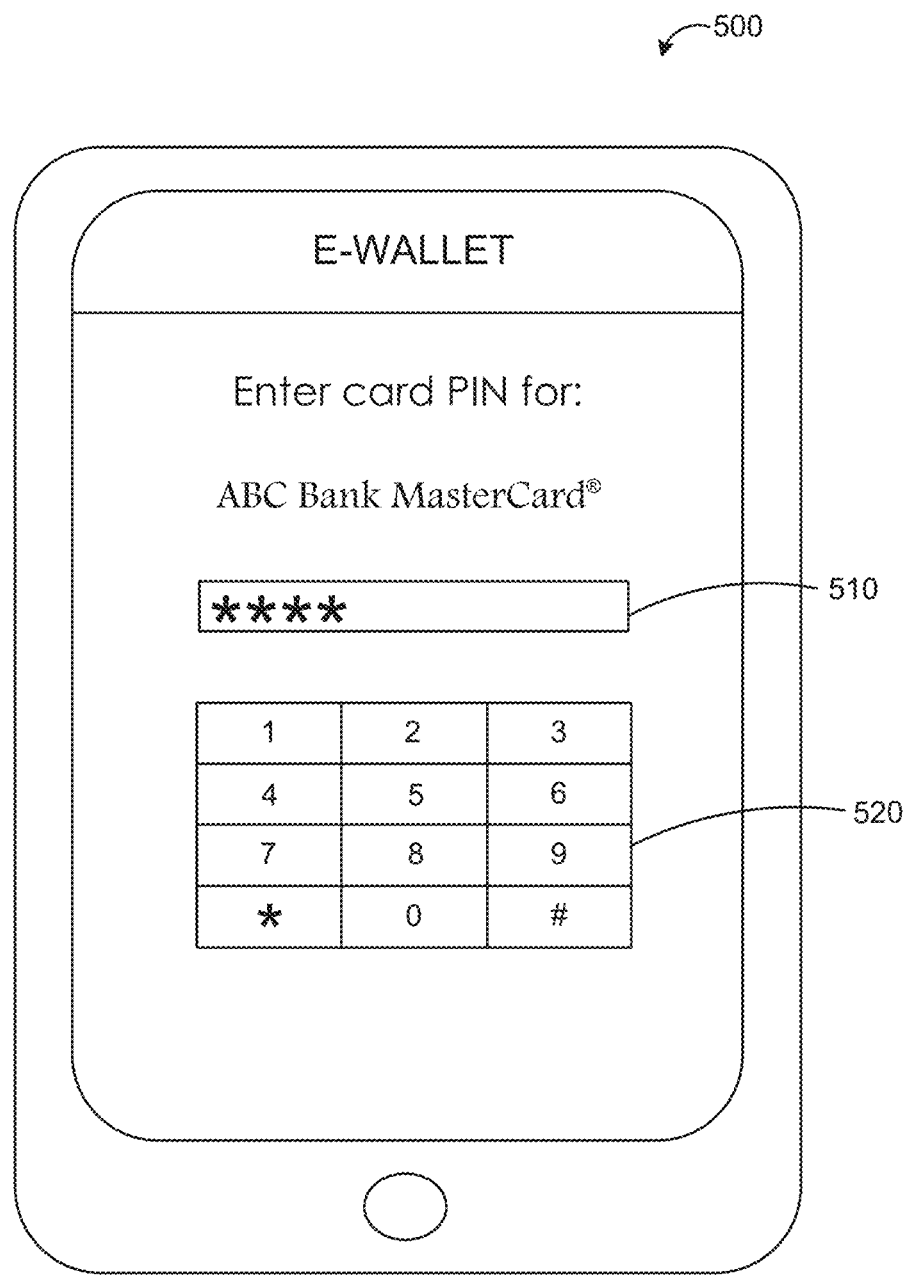
FIG. 5 is an example screenshot illustrating a Personal Identification Number (PIN) entry screen for an electronic wallet application executing on a mobile device.

Referring simultaneously to FIG. 5, illustrated therein generally as 500, is an example screenshot showing a Personal Identification Number (PIN) entry user interface of an e-wallet 114 on a mobile device. For example, the user interface may have a field 510 to display the number of digits that has been entered (the entered digits are shown as '*'s to reduce the likelihood of the PIN being compromised, according to known methods), as well as a keypad 520 for entering the PIN. The inputted PIN may then be verified against an encrypted PIN. Continuing with the example in which a purchaser buys various items from the merchant "BEST MART", the mobile device may receive a PIN inputted by a user for verification against the encrypted PIN stored on the secure element 116.

It will be understood that other types of card security credentials may also be stored on the secure element 116, and verified by the e-wallet 114 of the mobile device. For example, additional security credentials may include some other form of shared secret besides a PIN, or biometric information such as a fingerprint scan, retina scan and/or facial recognition information of the owner of the payment card. Depending on the type of card security credential, the e-wallet 114 may be configured to provide a user interface for entering a security input that is appropriate for the card security credential.

In various embodiments, the e-wallet 114 may be configured to require a second security credential to be verified. Steps 230 and 235 (shown in dotted outline in FIG. 2) relate to these embodiments, and are optional. For ease of exposition, they will be discussed below after the discussion of step 240.

At step 240, the mobile device 112 sends the card payment information and confirmation that the card was present during the verifying for use in completing the e-commerce transaction. The e-wallet 114 may be configured to send this information directly to the processing gateway 140 for authorization. In alternate embodiments, the e-wallet 114 may be configured to encrypt and send this data to merchant server 130, which, in turn, may relay it to the processing gateway 140 for authorization.

As noted above, the authorization process may include the processing gateway 140 further sending the payment card information and/or the confirmation of card presence to other processing platforms such as an acquiring institution, a payment card network and/or an issuing institution. If these processing platforms approve the authorization of the payment card for use in the e-commerce transaction, the processing gateway 140 may then send a message to the merchant server 130 to indicate that payment for the e-commerce transaction has been authorized. As such, the e-commerce transaction may be considered to be complete if the payment card is authorized for use in the e-commerce transaction by the processing gateway 140.

Figure 6:
FIG. 6 is an example screenshot of an electronic commerce website illustrating completion of a transaction.

Referring to FIG. 6, illustrated therein generally as 600, is an example screenshot of an e-commerce website illustrating completion of a transaction for the example scenario of a purchaser making a purchase of a "Tablet Computer" and a "Wall Charger" and the e-commerce merchant "BEST MART". The internet browser (e.g., a web browser) may be the same as the one with which the purchaser initiated the e-commerce transaction with. As such, the internet browser may show the same controls 312 for navigation (in the example, the uniform resource locator (URL) has been updated to navigate to a new webpage that indicates that the e-commerce transaction has completed). The internet browser may also show an updated version of the user interface 314' of the "BEST MART" e-commerce store that shows a message 620 that indicates that the "check out" process is now complete. During the passage of time in between the selection of the e-wallet 114 for payment and the notification from the processing gateway 140 to the merchant server 130 that authorization has been approved, the e-wallet payment module 132 may be configured to display a user interface element that indicates that processing is occurring (e.g., an 'waiting' icon such as an hourglass).

As noted above, in a traditional e-commerce transaction, merchant server 130 typically sends the card payment information to the processing gateway 140 to seek authorization for use of the payment card in the e-commerce transaction. In such scenario, the card payment information is typically manually entered into the e-commerce website such that these transactions are considered to be CNP. CNP transactions typically cost the merchant a higher amount of processing fees due to the risk of fraud involved with the processing of such transactions.

Even if the payment is processed through a third-party payment service such as Paypal®, the transaction would nevertheless still be CNP. In such transactions, although the merchant server 130 does not have to process payment card information itself, the eventual charge to the purchaser's credit card is based on payment card information alone, i.e., a CNP transaction.

In contrast, in the subject embodiments, the mobile device 112 transmits a confirmation that the payment card was present during the verifying to the merchant gateway 140 for authorization. This allows the processing gateway 140 to process the payment as a CP transaction, thereby avoiding higher processing fees associated with CNP transactions.

The optional steps (steps 230 and 235 of FIG. 2) of verifying a secondary security input against a secondary security credential will now be discussed in greater detail. Reference will simultaneously be made to FIG. 7, which shows an example screenshot of an e-wallet application 114, in which the applicability of the secondary security credential can be configured.

It will be understood that although the steps of determining whether a second security credential is required to be verified (step 230) and verifying a secondary security input against the secondary credential (step 235) is shown as a part of the method of conducting an e-commerce transaction illustrated in FIG. 2, such steps are not limited to the e-commerce transactions. For example, a secondary security credential may be verified at other types of transactions, such as a point-of-sale transaction.

The secondary security credential may be independent and separate from the card security credential. While the card security credential (e.g., an encrypted PIN) may be the same security credential as that which is stored on the corresponding physical plastic card, the secondary security credential may be provided by the e-wallet application 114 to provide supplementary or additional security.

The secondary card security credential may be any type of security credential that a security input received by the mobile device 112 can be verified against. For example, this may be an additional encrypted PIN (or some other form of shared secret), or a biometric credential (e.g., facial recognition information, retina scan and/or fingerprint). In various embodiments, the secondary security credential may also be stored on the secure element 116 of the mobile device 112.

The e-wallet application 114 may be configured to present a user interface that is capable of allowing a user to add, select and modify rules for when verification of the secondary security credential would be required. Such ability to configure rules may be used by a purchaser who desires to add supplemental security when they deem the primary card security credential to be insufficient. For example, some merchants may partake in a service offered by the payment card issuing institution that does not require the entering of a security credential for transactions that are less than a predetermined amount (e.g., MasterCard®s Quick Payment Service (QPS) that does not require the entry of a PIN for purchases less than $50). In such transactions, the owner of the e-wallet 114 may nevertheless desire that a security credential to be verified even though the merchant does not require the card security credential to be verified. As a result, the owner of the e-wallet 114 may add a rule that specifies that for amounts less than or greater than some trigger amount (e.g., "$50"), a secondary security input is required to be inputted to be verified against the secondary security credential before the transaction can proceed.

Figure 7:
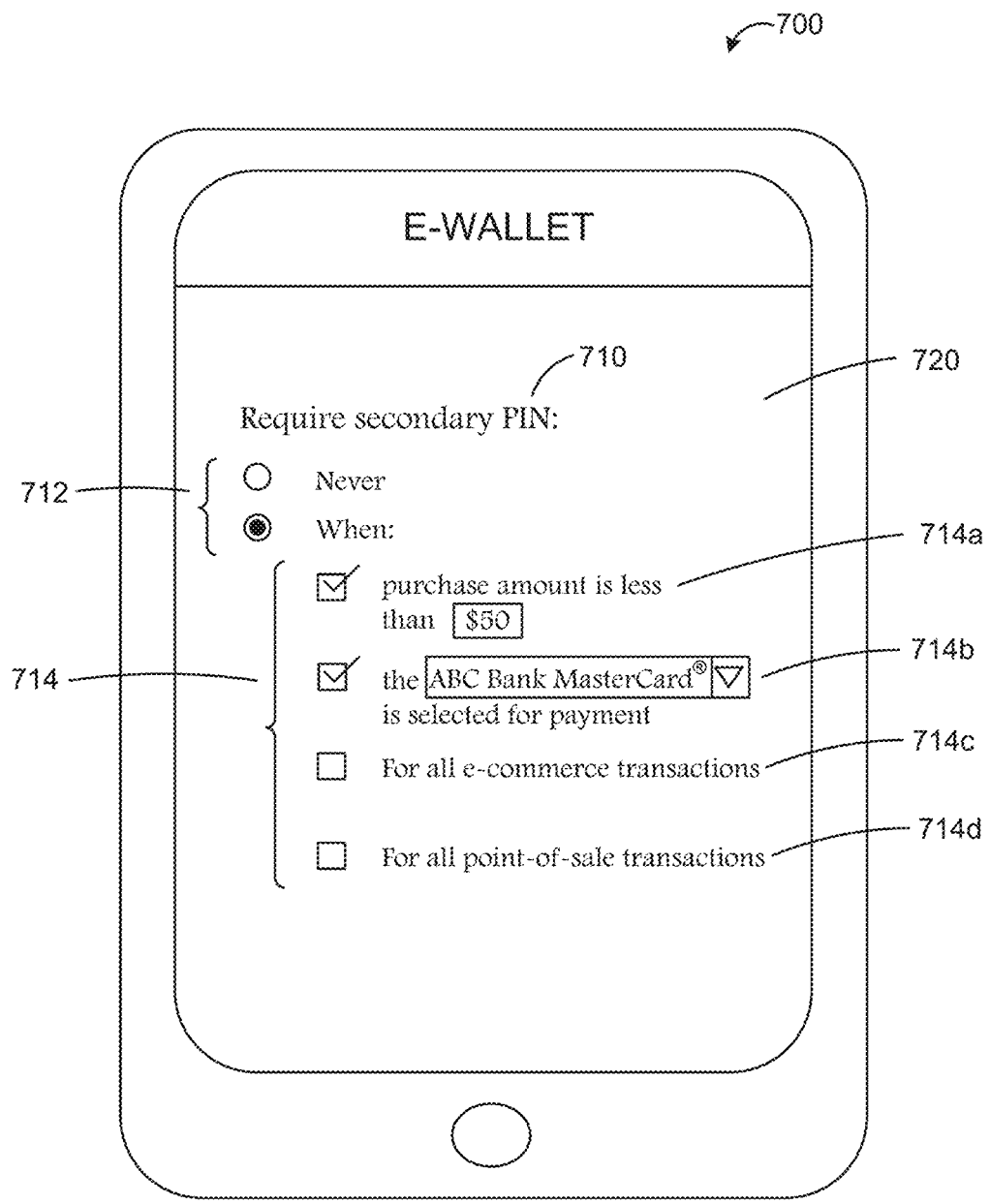
FIG. 7 is an example screenshot illustrating configuration of a secondary security credential configuration for an electronic wallet application executing on a mobile device.

Referring to FIG. 7, illustrated therein is an example screenshot illustrating a secondary security credential configuration screen of an e-wallet 114 on a mobile device 112, shown generally as 700. In the illustrated example, the e-wallet application 114 may display a user interface 720 that allows an owner of the e-wallet 114 to specify when a secondary security credential (e.g., a secondary PIN 710) needs to be verified. As illustrated, the user interface displays radio button controls 712 to allow the owner of the e-wallet 114 to select whether or not a secondary PIN is required. If a user selects to require a secondary PIN, the user interface 720 may further present user-selectable rules 714 for when the secondary PIN is required.

The user may select one or more rules specifying situations when the secondary PIN would be required to be verified. In the illustrated embodiment, the user may be able to select whether the rule applies by checking the checkbox 714 next to the described rule.

A rule 714a may be one that includes a trigger amount that is used by the e-wallet 114 for comparing against a transaction amount. For example, the e-wallet 114 may assess whether an amount of a transaction (e.g., an e-commerce transaction as described above) is less than or greater than the trigger amount. If so, the secondary security credential may be required. As illustrated, the owner of the e-wallet 114 has applied a rule 714a that indicates that a secondary PIN is to be required "when the purchase amount is less than $50". In various embodiments, the trigger amount may be fixed or user-configurable (for example, the illustrated trigger amount of "$50" may be configured via entry of text into the text field).

Another example rule 714b may include the identification of a predetermined payment card that requires verification of the secondary security credential when it is selected for payment. If such rule 714b is selected to be applied, the determining may include assessing whether the payment card selected for payment in the e-commerce transaction corresponds to the predetermined payment card identified in the rule. As illustrated, the owner of the e-wallet 114 has applied the rule 714*b* that indicates that the secondary PIN is required when "the 'ABC Bank MasterCard®' is selected for payment".

Other example rules requiring the secondary PIN include basing such determination on the type of transaction being executed (e.g., e-commerce transactions 714*c* or point-of-sale transactions 714*d*). It will be understood that the rules described herein are provided as examples only, and that other rules for determining whether a secondary security credential is required to be verified may be possible. For example, the rules may additionally or alternatively be varied based on the following factors: time of the transaction, conditions of the transaction, place/location of the transaction, frequency of payments for historical transactions, currency of the transaction, terms of payment of the transaction, whether the transaction is for a product or a service, or any combination of such factors.

As illustrated, there may be pre-defined or default rules (e.g., "for all e-commerce transactions" 714*c*), or user-configurable rules (such as rule 714*a* requiring the entry of the trigger amount or rule 714*b* that requires the selection of a payment card).

In various embodiments, the user interface 720 of the e-wallet 114 may be further configured to specify the order in which the rules are to be evaluated (not shown). Such configuration may be desirable in scenarios where the applying the rules may result in a conflicting result of whether a secondary security credential is required to be verified. For example, if a first rule indicates a secondary security credential is required for "all transaction amounts less than $50", and a second rule indicates that a secondary security credential is "only required for the 'ABC Bank MasterCard®' payment card and not for any other payment cards", then the user interface may allow a user to specify that the first rule is to be evaluated before the second rule such that a transaction amount for less than "$50" on the e-wallet owner's "Rewards Visa®" card still results in the secondary security credential being required to be verified (e.g., evaluation of the first rule would result in the second security credential being required even if evaluation of the second rule would result in the second security credential not being required).

If an owner of the e-wallet 114 selects to require a secondary security credential, the e-wallet 114 may also be configured to provide a user interface (not shown) for allowing the user to set up the secondary security credential. For example, if the secondary security credential is a secondary PIN, the e-wallet 114 may also be configured to provide a user interface for allowing the user to initialize what the PIN should be. It will be understood that such initialization may occur prior to the second security credential being available for use in verification during a transaction.

After having initialized the second security credential and selected the rules for when it is required to be verified, the rules may be evaluated during payment for a transaction.

Returning to the flowchart in FIG. 2 which describes a series of steps for an example embodiment of processing payment for an e-commerce transaction, steps 230 and 235 describe the optional steps for embodiments which employ a secondary security credential.

At step 230, the mobile device 112 may optionally determine if a secondary security credential is required to be verified. This may involve evaluating the transaction (including the payment card selected for payment at FIG. 4) against the rules described above with respect to FIG. 7. In the illustrated example, this may involve evaluating the requested e-commerce transaction at the merchant "BEST MART" against the rules that the owner of the e-wallet 114 has selected for determining whether a secondary security credential is required to be verified.

In the illustrated embodiment of FIG. 7, two rules were selected. As such, to determine whether a secondary PIN needs to be entered for the e-commerce transaction at the "BEST MART" merchant, the e-wallet 114 would determine whether the total transaction amount was less than $50 (the first rule 714*a*), and whether the owner of the e-wallet 114 had selected the "ABC Bank MasterCard®" card for payment (the second rule 714*b*). Since the total amount payable in the e-commerce transaction ("$625" 424 in FIG. 4) is greater than the "$50" indicated by the first rule 714*a*, the first rule would not result in the secondary PIN being required. However, as the owner of the e-wallet 114 had selected the "ABC Bank MasterCard®" card for payment in FIG. 4, the second rule 714*b* would result in the secondary PIN being required to be verified.

At step 235, the mobile device 112 may optionally verify the secondary security credential if determined to be required at step 230. As with the card security credential discussed above, this may involve the e-wallet 114 being configured to provide a user interface for entering a secondary security credential (e.g., a PIN, or biometric input such as a fingerprint scan, facial recognition information or retina scan). In the illustrated example, since the second user-selected rule 714*b* triggered the secondary PIN to be required, the e-wallet 114 may be configured to further present a user interface for entering a secondary PIN similar to the user interface shown in FIG. 5.

If the secondary security credential is verified, the mobile device 112 may proceed with other acts of authorization, as, for example, discussed above with respect to step 240.

The present invention has been described here by way of example only. Various modification and variations may be made to these exemplary embodiments without departing from the spirit and scope of the invention, which is limited only by the appended claims.

For example, the steps of a method in accordance with any of the embodiments described herein may be performed in any order, whether or not such steps are described in the claims, figures or otherwise in any sequential numbered or lettered manner. Also, in the various user interfaces illustrated in the figures, it will be understood that the illustrated user interface text and controls are provided as examples only and are not meant to be limiting. Other suitable user interface elements may be possible.

We claim:

1. A method of processing payment during an electronic commerce transaction, the method comprising:

storing, in an electronic wallet of a mobile device, (i) an electronic payment card and (ii) a secondary security credential available for verification, the electronic payment card comprising:

card payment information, and a card security credential against which a presence of the electronic payment card is verified to enable a "Card Present" transaction and the card security credential is different from the secondary security credential;

receiving, at the mobile device, an activation message in response to a request to conduct the electronic commerce transaction;

receiving, at the mobile device, a card selection input indicating selection of the electronic payment card stored in the electronic wallet for payment in the electronic commerce transaction;

in response to receiving the card selection input, verifying, at the mobile device, a security input against the card security credential of the electronic payment card;

in response to successfully verifying the security input against the card security credential of the electronic payment card, determining, based on a user-selectable rule stored at the mobile device, if the secondary security credential is required to be verified, and if the secondary security credential is determined to be required, verifying the secondary security credential with a secondary security input, and in response to one of (i) determining that verifying the secondary security credential is not required and (ii) successfully verifying the security input against the card security credential of the electronic payment card, sending, from the mobile device, the card payment information, and a confirmation data signal confirming the presence of the electronic payment card during the verifying, for use in completing the electronic commerce transaction.

2. The method of claim 1, wherein the card payment information and the confirmation data signal are sent to a merchant processing gateway for authorization, and wherein the electronic commerce transaction is completed if the electronic payment card is authorized by the merchant processing gateway for use in the electronic commerce transaction.

3. The method of claim 1, wherein the request comprises an identifier for identifying the mobile device when sending the activation message, the identifier being unrelated to the electronic payment card.

4. The method of claim 3, wherein the identifier comprises a phone number and the activation message comprises a Short Message Service (SMS) message.

5. The method of claim 1, wherein the electronic commerce transaction is initiated by a purchaser device connecting to a merchant server.

6. The method of claim 1, wherein the card security credential comprises an encrypted Personal Identification Number (PIN) for the electronic payment card and the security input comprises a PIN received as input into the mobile device, and wherein the verifying comprises determining whether the inputted PIN matches the encrypted PIN.

7. The method of claim 1, wherein the mobile device comprises a secure element and the electronic wallet stores the payment card on the secure element.

8. The method of claim 1, wherein the user-selectable rule comprises a trigger amount, and the determining comprises assessing whether an amount of the electronic commerce transaction is one of: less than the trigger amount or greater than the trigger amount.

9. The method of claim 1, wherein the user-selectable rule comprises a predetermined electronic payment card for which verification of the secondary security credential would be required when selected for payment, and the determining comprises assessing whether the selected electronic payment card for payment in the electronic commerce transaction corresponds to the predetermined payment card.

10. The method of claim 1, wherein the user-selectable rule comprises a predetermined type of transaction being executed, and the determining comprises assessing whether the electronic commerce transaction is of the predetermined type of transaction.

11. A system for processing payment during an electronic commerce transaction, the system comprising:

a mobile device comprising a device processor and a device memory storing a first plurality of instructions, which when executed by the device processor, causes the device processor to provide an electronic wallet storing (i) an electronic payment card and (ii) a secondary security credential available for verification, the electronic payment card comprising card payment information, and a card security credential against which a presence of the electronic payment card is verified to enable a "Card Present" transaction and the card security credential is different from the secondary security credential;

wherein, the mobile device is further configured to:

receive an activation message in response to a request to conduct the electronic commerce transaction;

receive a card selection input indicating selection of the electronic payment card for payment in the electronic commerce transaction;

in response to receiving the card selection input, verify a security input against the card security credential of the electronic payment card;

in response to successfully verifying the security input against the card security credential of the electronic payment card, determining, based on a user-selectable rule stored at the mobile device, if the secondary security credential is required to be verified, and if the secondary security credential is determined to be required, verifying the secondary security credential with a secondary security input, and in response to one of (i) determining that verifying the secondary security credential is not required and (ii) successfully verifying the security input against the card security credential of the electronic payment card, send:

the card payment information, and a confirmation data signal confirming the presence of the electronic payment card during the verifying, for use in completing the electronic commerce transaction.

12. The system of claim 11, wherein the mobile device is further configured to send the card payment information and the confirmation data signal to a merchant processing gateway for authorization, and wherein the electronic commerce transaction is completed if the payment card is authorized by the merchant processing gateway for use in the electronic commerce transaction.

13. The system of claim 11, wherein the request comprises an identifier for identifying the mobile device when sending the activation message, the identifier being unrelated to the electronic payment card.

14. The system of claim 13, wherein the identifier comprises a phone number and the activation message comprises a Short Message Service (SMS) message.

15. The system of claim 11, wherein the electronic commerce transaction is initiated by a purchaser device connecting to a merchant server.

16. The system of claim 11, wherein the card security credential comprises an encrypted Personal Identification Number (PIN) for the electronic payment card and the security input comprises a PIN received as input into the mobile device, and wherein the verifying comprises determining whether the inputted PIN matches the encrypted PIN.

17. The system of claim 11, wherein the mobile device further comprises a secure element and the electronic wallet stores the electronic payment card on the secure element.

18. The system of claim 11, wherein the user-selectable rule comprises a trigger amount and the mobile device is further configured to assess whether an amount of the electronic commerce transaction is one of: less than the trigger amount or greater than the trigger amount.

19. The system of claim 11, wherein the user-selectable rule comprises a predetermined payment card that requires verification of the secondary security credential when selected for payment, and the mobile device is further configured to assess whether the selected electronic payment card for payment in the electronic commerce transaction corresponds to the predetermined electronic payment card.

20. The system of claim 11, wherein the user-selectable rule comprises a predetermined type of transaction being executed, and the mobile device is further configured to assess whether the electronic commerce transaction is of the predetermined type of transaction.

* * * * *